United States Patent
Tang et al.

(10) Patent No.: US 10,419,358 B2
(45) Date of Patent: Sep. 17, 2019

(54) PACKET BUFFERING

(71) Applicant: HEWLETT PACKARD ENTERPRISE DEVELOPMENT LP, Houston, TX (US)

(72) Inventors: Xiaohu Tang, Beijing (CN); Zhuxun Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/550,147

(22) PCT Filed: Feb. 4, 2016

(86) PCT No.: PCT/CN2016/073484
§ 371 (c)(1),
(2) Date: Aug. 10, 2017

(87) PCT Pub. No.: WO2016/127910
PCT Pub. Date: Aug. 18, 2016

(65) Prior Publication Data
US 2018/0026902 A1    Jan. 25, 2018

(30) Foreign Application Priority Data
Feb. 10, 2015    (CN) .......................... 2015 1 0069070

(51) Int. Cl.
*H04L 12/875*    (2013.01)
*H04L 12/861*    (2013.01)
(Continued)

(52) U.S. Cl.
CPC ............. *H04L 47/56* (2013.01); *H04L 45/66* (2013.01); *H04L 47/28* (2013.01); *H04L 47/30* (2013.01); *H04L 49/9047* (2013.01)

(58) Field of Classification Search
None
See application file for complete search history.

(56) References Cited

U.S. PATENT DOCUMENTS

2012/0271943 A1*  10/2012  Chen ................. H04L 45/745
                                                          709/224
2014/0078918 A1*  3/2014   Han .................... H04L 12/12
                                                          370/252

FOREIGN PATENT DOCUMENTS

CN    101478539 A    7/2009
CN    101483593 A    7/2009
(Continued)

OTHER PUBLICATIONS

International Search Report and Written Opinion, International Application No. PCT/CN2016/073484, dated Apr. 29, 2016, pp. 1-7, SIPO.

(Continued)

*Primary Examiner* — Faruk Hamza
*Assistant Examiner* — Cassandra L Decker (57) ABSTRACT

A first device as a buffer server in an Ethernet transmits a first buffer client querying packet from a port of enabling a distributed buffer function of the first device, receives a first buffer client registering packet from a second device through the port, and adds the second device into a distributed buffer group of the port. When the first device detects that a sum of sizes of packets entering the port and not transmitted reaches a preset first flow-splitting threshold in a first preset time period, the first device forwards a packet entering the port and not transmitted to a buffer client selected from the distributed buffer group of the port.

15 Claims, 6 Drawing Sheets

(51) Int. Cl.
*H04L 12/721* (2013.01)
*H04L 12/841* (2013.01)
*H04L 12/835* (2013.01)

(56) References Cited

FOREIGN PATENT DOCUMENTS

| | | | |
|---|---|---|---|
| CN | 101867511 | A | 10/2010 |
| CN | 102025631 | A | 4/2011 |
| CN | 103384252 | A | 11/2013 |
| CN | 104093159 | A | 10/2014 |
| CN | 104243334 | A | 12/2014 |
| WO | WO-2014022492 | A1 | 2/2014 |

OTHER PUBLICATIONS

International Preliminary Report on Patentability received for PCT Patent Application No. PCT/CN2016/073484, dated Aug. 24, 2017, 6 pages.

* cited by examiner

PACKET BUFFERING

BACKGROUND

With rapid increasing of network transmission speed, network applications are widely used. Thus, a great amount of packets are transmitted to corresponding destination devices through Ethernet switches. In the Ethernet switches, the packets enter ports, and are firstly buffered in a buffer on Media Access Control (MAC) chips as a high speed memory on the Ethernet switches, and then are forwarded to the corresponding destination devices.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

In some examples, in the Ethernet device, a buffer may be revised in a Common Buffer Pool (CBP) on a MAC chip as a high speed memory to buffer a packet entering a port. When the packet enters the port in the Ethernet device, the packet is buffered in the buffer on the Ethernet switch. When the packet is scheduled to be outputted, the packet is taken out from the buffer and is forwarded to a corresponding destination device.

In some examples, a CELL may be a basic storage unit in the buffer. A packet may be divided into blocks with a fixed length respectively to be stored in multiple CELLs in the buffer. When a CELL is not fully filled by the packet, a remaining area on the CELL may not be used for another data packet.

In some examples, the buffer is managed by a buffer Memory Management Unit (MMU) of the Ethernet device. In particular, when the packet enters the port, the MMU buffers the packet to the buffer in the CBP. And the MMU schedules the buffered packets to be outputted in order.

When buffers in Ethernet devices in a network or in a part of the network reach a saturation state, a network throughput is rapidly decreased, and a great amount of packets may be received out of order. Thus, a packet transmission delay may be sharply increased. In some examples, a size of the CBP on the Ethernet device is limited. For example, in a MAC chip on an Ethernet switch with 24 ports, the size of the CBP is 512K-8M. When the CBP is full, the Ethernet device has to discard packets entering to ports.

Figure 1:
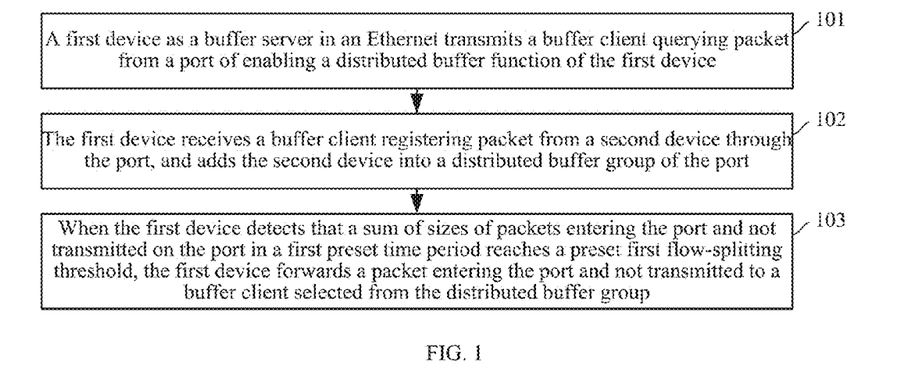
FIG. 1 is a flow chart illustrating a packet buffering method according to some examples of the present disclosure.

FIG. 1 is a flow chart illustrating a packet buffering method according to some examples of the present disclosure. The method includes procedures as follows.

At block 101, a first device as a buffer server in an Ethernet transmits a buffer client querying packet from a port of enabling a distributed buffer function of the first device.

At block 102, the first device receives a buffer client registering packet from a second device through the port, and adds the second device into a distributed buffer group of the port.

At block 103, when the first device detects that a sum of sizes of packets entering the port and not transmitted on the port in a first preset time period reaches a preset first flow-splitting threshold, the first device forwards a packet entering the port and not transmitted to a buffer client selected from the distributed buffer group.

In some examples, after the first device detects that the sum of the sizes of the packets entering the port and not transmitted reaches the preset first flow-splitting threshold in the first preset time period, the first device stops forwarding the packet entering the port and not transmitted to the selected buffer client when the first device detects that the size of the packets entering the port and not transmitted is lower than a preset second flow-splitting threshold in a preset second time period.

In some examples, at block 103, before the first device detects that the sum of the sizes of the packets not transmitted on the port reaches the preset first flow-splitting threshold in the preset first time period, the first device starts to transmit a Pause frame when the first device detects that the sum of the sizes of the packets not transmitted on the port reaches a preset first pause threshold in a preset third time period, wherein the first pause threshold is less than the first flow-splitting threshold.

In some examples, at block 103, after the first device detects that the sum of the sizes of the packets entering the port and not transmitted reaches the first flow-splitting threshold in the preset first time period, the first device starts to discard the packets entering the port and not transmitted when the first device detects that the sum of the sizes of the packets entering the port and not transmitted reaches a packet discarding threshold in a preset fourth time period, wherein the packet discarding threshold is more than the first flow-splitting threshold.

In some examples, before the first device detects that the sum of the sizes of the packets entering the port and not transmitted is lower than the preset second flow-splitting threshold in the preset second time period, the first device stops discarding the packets entering the port and not transmitted when the first device detects that the sum of the sizes of the packets entering the port and not transmitted decreases to a preset packet discarding threshold in a preset fifth time period, wherein the packet discarding threshold is more than the second flow-splitting threshold;

In some examples, after the first device detects that the sum of the sizes of the packets not transmitted on the port is lower than the preset second flow-splitting threshold in the preset second time period, the first device stops transmitting the Pause frame from the port when the first device detects that the sum of the sizes of the packets not transmitted on the port decreases to a preset second pause threshold in a preset sixth time period, wherein the second flow-splitting threshold is more than the second pause threshold.

In some examples, at this block 101, the buffer client querying packet may carry a Virtual Local Area Network (VLAN) Identifier (ID) on the first device.

In some examples, at block 102, the buffer client registering packet may carry a VLAN ID of the second device used for the distributed buffer function.

In some examples, at block 103, in the process that the first device forwards the packet to the selected buffer client, the first device adds the VLAN ID of the selected buffer client used for the distributed buffer function into the packet, and forwards the packet to the selected buffer client.

For example, the buffer client querying packet may carry all VLAN IDs on the first device. The VLAN ID of the second device used for the distributed buffer function may be different from each of the VLAN IDs on the first device.

In some examples, at block 102, the buffer client registering packet may further carry a size of a distributed buffer area reserved in a CBP for the first device, so that the buffer server may select the buffer client from the distributed buffer group of the port according to sizes of distributed buffer areas respectively reserved on the buffer clients in the distributed buffer group for the first device.

In some examples, at block 101, when the first device transmits the buffer client querying packet from the port, the first device may start a responding timer.

When receiving the buffer client registering packet from the port before the responding timer expires, the first device may add the second device into the distributed buffer group as the buffer client, set and start a host computer aging timer for the second device when the second device is in the distributed buffer group, and may restart the host computer aging timer of the second device when the second device has been as the buffer client in the distributed buffer group.

When receiving the buffer client registering packet from the second device through the port after the responding timer expires, the first device discards the buffer client registering packet.

In some examples, when the first device detects that a host computer aging timer of a third device in the distributed buffer group of the port expires, the first device may transmit a second buffer client querying packet to the third device, and start the responding timer. If the buffer client registering packet from the third device is not received before the responding timer expires, the first device may delete the third device from the distributed buffer group. If the buffer client registering packet from the third device is received before the responding timer expires, the first device may restart the host computer aging timer of the third device.

In some examples, a timing period of the host computer aging timer is more than a transmission period of the buffer client querying packet, and the transmission period of the buffer client querying packet is more than a timing period the responding timer.

In some examples, at block 103, when the packet entering the port and not transmitted is from the buffer client in the distributed buffer group of the port, the first device forwards the packet to a destination device of the packet in local. In some examples, when the packet entering the port and not transmitted is a Dynamic Host Configuration Protocol (DHCP) class packet based on a IP encapsulation protocol, a Spanning Tree Protocol (STP) class multicast packet based on a reserved protocol, or a routing control protocol packet, the first device forwards the packet to a destination device of the packet in local. In some examples, when a priority of the packet entering the port and not transmitted is more than a preset priority threshold, the first device forwards the packet to a destination device of the packet in local; when the priority of the packet entering the port and not transmitted is not more than the preset priority threshold, the first device forwards the packet to a buffer client in the distributed buffer group of the port. In some examples, when the packet entering the port and not transmitted is an unknown unicast packet, the first device forwards the packet to a buffer client in the distributed buffer group. In some examples, when the packet entering the port and not transmitted is a known unicast packet, a multicast packet, or a broadcasting packet, the first device performs a Hash calculation for a preset characteristic value of the packet, according to a Hash calculation result, and a remaining size of the CBP on the port of the first device and sizes of distributed buffer areas reserved for the first device respectively on buffer clients in the distributed buffer group of the port. The first device determines whether to forward the packet to the destination device of the packet or to forward the packet to a buffer client in the distributed buffer group of the port.

In some examples, when receiving a buffer client leaving packet from a fourth device through the port, the first device transmits a third buffer client querying packet to the fourth device, and starts a responding timer. When a buffer client registering packet is not received from the fourth device when the responding timer expires, the first device deletes the fourth device from the distributed buffer group of the port.

In some examples, the buffer client query packet may be a slow protocol reserved protocol multicast packet.

In some examples, the second device, the third device and the fourth device may be a same device, or may be different devices, which is not limited in the present disclosure. In some examples, each of the first buffer client querying packet, the second buffer client querying packet and the third buffer client querying packet may be a multicast packet or a unicast packet, which is not limited in the present disclosure. In some examples, the packet entering the port and not transmitted may be a data packet or a control packet, which is not limited in the present disclosure.

Figure 2:
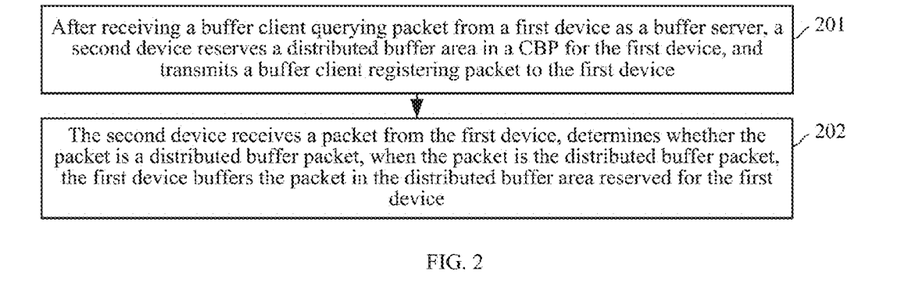
FIG. 2 is a flow chart illustrating a packet buffering method according to some examples of the present disclosure.

FIG. 2 is a flow chart illustrating a packet buffering method according to some examples of the present disclosure. The method includes procedures as follows.

At block 201, after receiving a buffer client querying packet from a first device as a buffer server, a second device reserves a distributed buffer area in a CBP for the first device, and transmits a buffer client registering packet to the first device.

At block 202, the second device receives a packet from the first device, determines whether the packet is a distributed buffer packet, and buffers the packet in the distributed buffer area reserved for the first device when the packet is the distributed buffer packet.

In some examples, at block 201, the buffer client querying packet may carry a VLAN ID on the first device, and the buffer client registering packet may carry a VLAN ID of the second device used for the distributed buffer function.

In some examples, at block 202, in the process of determining whether the packet is the distributed buffer packet, the second device determines whether the packet carries a VLAN ID of the second device used for a distributed buffer function, the second device determines that the packet is the distributed buffer packet when the packet carries the VLAN ID of the second device used for a distributed buffer function.

In some examples, at block 201, the buffer client registering packet may further carry a size of the distributed buffer area reserved in a CBP for the first device, so that the buffer server may select the buffer client from the distributed buffer group of the port according to sizes of distributed buffer areas respectively reserved on the buffer clients in the distributed buffer group for the first device.

In some examples, at block 202, after the second device buffers the packet in the distributed buffer area reserved for the first device, according to a FIFO way, the second device returns the packet to the first device after the second device waits for a buffer time period from a time point of returning a previously-buffered packet to the first device.

When the second device receives a packet, the second device may calculate a buffer time period for the packet, and buffers the packet in the distributed buffer area. Buffer timing for each packet in the distributed buffer area is started at a time point of returning a previously-buffered packet to the first device. For example, it is assumed that a buffer time period for a first packet in the distributed buffer area is t1, a buffer time period for a second packet in the distributed buffer area is t2, . . . , and a buffer time period for a m-th packet in the distributed buffer area is tm. Thus, the first packet is returned to the first device after the first packet is buffered for the t1. A buffer timer for the second packet is configured with the t2, and is started at a time point of returning the first packet to the first device. When the buffer timer for the second packet expires, the second packet is returned to the first device. A buffer timer for the third packet is configured with the t3, and is started at a time point of returning the second packet to the first device. When the buffer timer for the third packet expires, the third packet is returned to the first device, and so on.

In some example, at block 202, when the packet is buffered in the distributed buffer area reserved for the first device, the second device multiplies n by quanta to obtain T, wherein T is a buffer time period, n is a substantially random value between 0 and 65535, and quanta is a pause time quantum, and a quantum is 512 bit times.

In some examples, when the second device closes the distributed buffer function, the second device transmits a buffer client leaving packet to each buffer server to which the second device has registered.

In some example, at block 202, after the second device determines that the packet is the distributed buffer packet, the packet may be discarded when the distributed buffer area reserved for the first device is full.

Figure 3:
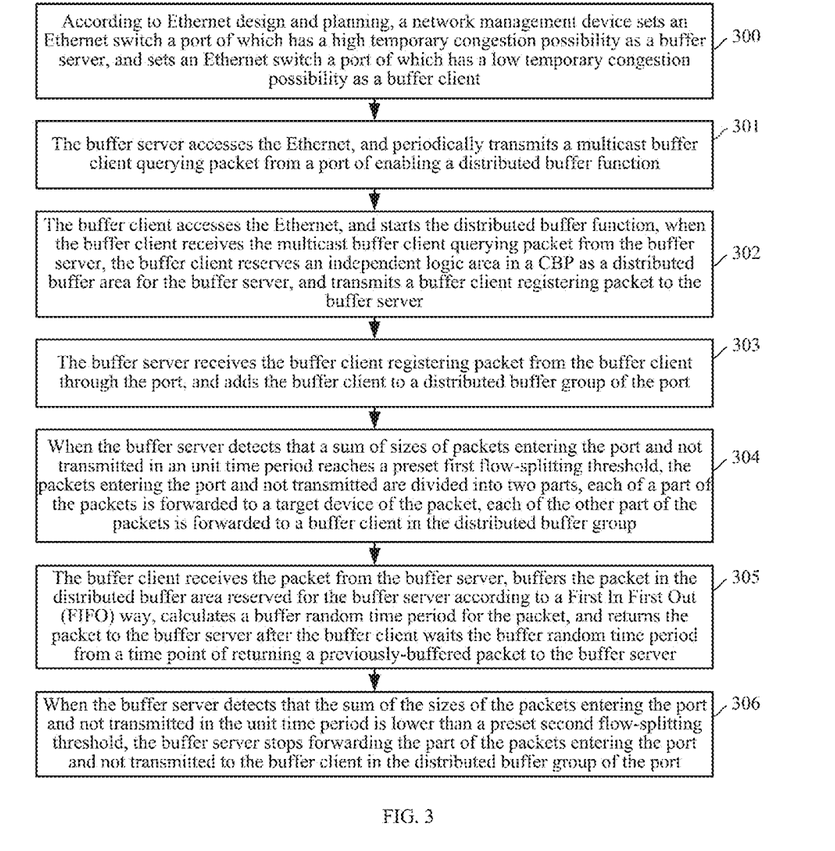
FIG. 3 is a flow chart illustrating a packet buffering method according to some examples of the present disclosure.

FIG. 3 is a flow chart illustrating a packet buffering method according to some examples of the present disclosure. The method includes procedures as follows.

At block 300, according to Ethernet design and planning, a network management device sets an Ethernet switch a port of which has a high temporary congestion possibility as a buffer server, and sets an Ethernet switch a port of which has a low temporary congestion possibility as a buffer client.

At block 301, the buffer server accesses the Ethernet, and periodically transmits a multicast buffer client querying packet from a port of enabling a distributed buffer function.

At block 302, the buffer client accesses the Ethernet, and starts the distributed buffer function, when the buffer client receives the multicast buffer client querying packet from the buffer server, the buffer client reserves an independent logic area in a CBP as a distributed buffer area for the buffer server, and transmits a buffer client registering packet to the buffer server.

At block 303, the buffer server receives the buffer client registering packet from the buffer client through the port, and adds the buffer client to a distributed buffer group of the port.

At block 304, when the buffer server detects that a sum of sizes of packets entering the port and not transmitted in a unit time period reaches a preset first flow-splitting threshold, the packets entering the port and not transmitted are divided into two parts, each of a part of the packets is forwarded to a destination device of the packet, each of the other part of the packets is forwarded to a buffer client in the distributed buffer group.

In some examples, when the MMU of the buffer server detects that the sum of the sizes of packets entering the port and not transmitted increases to the preset first flow-splitting threshold in the unit time period, the buffer server notifies the PIC to start to use a flow-splitting strategy, the PIC divides the packets entering the port and not transmitted into two parts, forwards each of a part of the packets to the destination device of the packet, and forwards each of the other parts of the packets to a buffer client in the distributed buffer group of the port.

In some examples, after the packet enters the PIC of the port, the PIC performs a searching process (e.g., a layer 2 search, a routing search) to obtain packet related information such as a priority, and an egress port of the packet. When the buffer server determines to forward the packet to the destination device of the packet, the PIC transmits the packet and the search result of the packet to the MMU, and the MMU buffers the packet in CELLs in the CBP through a linked list. When the packet is outputted to the destination device of the packet, the MMU takes out the packet from the CELLs in the CBP, the PIC re-assembles the packet, transmits the packet to a physical layer, and forwards the packet to the destination device through an egress port in the packet related information.

In some examples, at block 304, for each packet entering the port and not transmitted, the packet is forwarded as follows.

1. When the packet is a distributed buffer packet returned from the buffer client, the packet is directly forwarded to the destination device of the packet, wherein the distributed buffer packet has previously been forwarded to the buffer client, and has been buffered in the buffer client.

2. When the packet is a DHCP class packet based on a IP encapsulation protocol, a STP class multicast packet based on a reserved protocol, or a routing protocol control packet (e.g., a Border Gateway Protocol (BGP)), the packet is directly forwarded to the destination device of the packet.

3. When the packet is a an IP packet carrying a priority, the IP packet is forwarded to the destination device of the packet if the priority of the IP packet is more than a preset priority threshold, and the IP packet is forwarded to the buffer client in the distributed buffer group if the priority of the IP packet is lower than or equal to the preset priority threshold.

In some example, the priority of the packet may be carried in a priority field in a VLAN Tag, or a Type of Service (TOS) field.

4. when the packet is a known unicast packet, a multicast packet, or a broadcasting packet, Hash calculation is performed for a preset characteristic value of the packet (e.g., selected from the group consisting of a source MAC address, a target MAC address, a source IP address, a target IP address, a link layer protocol type, and combinations thereof), according to a Hash calculation result, a size of the CBP on the port, a remaining size of the CBP on the port and the number of the buffer clients in the distributed buffer group of the port, it is determined whether the packet is forwarded to the destination device of the packet or to a buffer client in the distributed buffer group of the port.

For example, assume that the buffer server has ten Hash buckets; after the sum of the sizes of the packets not transmitted on the port reaches the preset first flow-splitting threshold in the preset unit time period, the buffer server detects that the remaining size of the CBP buffer on the port is 1MB; there are three buffer clients in the distributed buffer group of the port, respectively buffer clients A-C; and registered sizes of distributed buffer areas on the buffer clients A-C are respectively 1MB, 1MB and 0.5MB (in this example, the buffer client registering packet carries the size of the distributed buffer area reserved for the buffer server), a preset Hash bucket allocating rule is as follows.

The packet hitting one of Hash buckets 0-4 is forwarded to the destination device of the packet. The packet hitting a Hash bucket 5 or 6 is forwarded to the buffer client A. The packet hitting a Hash bucket 7 or 8 is forwarded to the buffer client B. The packet hitting a Hash bucket 9 is forwarded to the buffer client C.

The buffer server performs Hash calculation for a characteristic value (e.g., selected from the group consisting of a source MAC address, a target MAC address, a source IP address, a target IP address, a link layer protocol type, and combinations thereof) of the packet to obtain a N-bit abstract (N is not less than zero and is not more than nine), and 1) when N is equal to one of 0-4, the Hash bucket N is hit, and the packet is forwarded to the destination device of the packet;

2) when N is equal to 5 or 6, the Hash bucket N is hit, and the packet is forwarded to the buffer client A;

3) when N is equal to 7 or 8, Hash bucket N is hit, and the packet is forwarded to the buffer client B; and 4) when N is equal to 9, Hash bucket 9 is hit, and the packet is forwarded to the buffer client C.

In some examples, the buffer server may dynamically adjust the Hash bucket allocating rule according to a remaining size of a CBP on the port. In particular, when the remaining size of the CBP on the port decreases a preset buffer step length, the number of the Hash buckets mapped to the buffer server is increased according to a preset Hash bucket step length.

5. When the packet is an unknown unicast packet, the packet is forwarded to the buffer client in the distributed buffer group of the port.

In some examples, at block 304, the method may further include procedures as follows. When a MMU of the buffer server detects that the sum of the sizes of packets not transmitted on the port increases to a preset first pause threshold in the unit time period, the buffer server notifies the PIC of the port to start to use a pause strategy, and the PIC starts continuously to transmit a Pause frame from the port, so that a device transmitting packets to the buffer server pauses the packet transmission to the port.

In some examples, at block 304, the method may further include procedures as follows. When the MMU of the buffer server detects that the sum of the sizes of the packets not transmitted on the port increases to a preset packet discarding threshold in the unit time period, the MMU notifies the PIC of the port to start to use a packet discarding strategy, the PIC discards a part of packets with a low priority according to a preset scheduling way.

In some examples, the packet discarding threshold is more than the first flow-splitting threshold, the first flow-splitting threshold is more than the first pause threshold.

At block 305, the buffer client receives the packet from the buffer server, buffers the packet in the distributed buffer area reserved for the buffer server according to a First In First Out (FIFO) way, calculates a buffer random time period for the packet, and returns the packet to the buffer server after the buffer client waits the buffer random time period from a time point of returning a previously-buffered packet to the buffer server.

In some examples, the buffer random time period of the packet T may be calculated by multiplying n by quanta, wherein n is a random value between 0 and 65535, and quanta is a pause time quantum, a quantum is 512 bit times.

A bit time is a time period used for transmission of 1 bit on a MAC media, the value of the bit time is a reciprocal of a bitrate. For example, in a 100M link, 1 bit time is equal to 10 ns. Values of bit times may be different on links with different speeds. In particular, on the link, the higher the transmission speed, the less the value of the bit time.

At block 306, when the buffer server detects that the sum of the sizes of the packets entering the port and not transmitted in the unit time period is lower than a preset second flow-splitting threshold, the buffer server stops forwarding the part of the packets entering the port and not transmitted to the buffer client in the distributed buffer group of the port.

In some examples, procedures at block 306 may be performed as follows.

In some examples, when the MMU of the buffer server detects that the sum of the sizes of the packets entering the port and not transmitted decreases to a preset second flow-splitting threshold in the unit time period, the MMU notifies the PIC stops using the flow-splitting strategy, and the PIC stops forwarding the packet entering the packet and not transmitted to the buffer client.

In some examples, at block 306, the method may further include procedures as follows. When the MMU of the buffer server detects that the sum of the sizes of the packets entering the port and not transmitted decreases to the preset packet discarding threshold in the unit time period, the MMU notifies the PIC stops using the packet discarding strategy, and the PIC stops discarding the packets entering the packet and not transmitted. In some examples, at block 306, the method may further include procedures as follows. When the MMU of the buffer server detects that the sum of the sizes of the packets entering the port and not transmitted decreases to the preset second pause control threshold in the unit time period, the MMU notifies the PIC stops using the pause strategy, and the PIC stops transmitting the Pause frame from the port.

Figure 4:
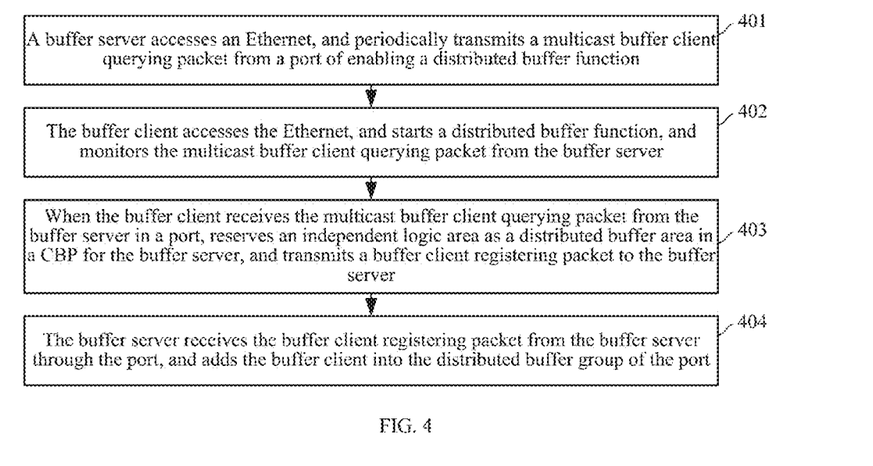
FIG. 4 is a flow chart illustrating a method that a buffer client registers to a buffer server according to some examples of the present disclosure.

FIG. 4 is a flow chart illustrating a method that a buffer client registers to a buffer server according to some examples of the present disclosure. The method includes procedures as follows.

At block 401, a buffer server accesses an Ethernet, and periodically transmits a multicast buffer client querying packet from a port of enabling a distributed buffer function.

In some examples, procedures at block 401 may be similar to those at block 301.

In some examples, the multicast buffer client querying packet may carry a distributed buffer group identifier. The distributed buffer group identifier may be a MAC address or an electronic tag of the port of the buffer server to which the distributed buffer group belongs, so that the buffer client identifies the buffer server transmitting the multicast buffer client querying packet according to the buffer group identifier.

In some examples, multicast buffer client querying packet may be a slow protocol reserved protocol multicast packet, and a MAC address 0180C2000002 is used as a target MAC address of the multicast buffer client querying packet. According to the target MAC address 0180C2000002, the multicast buffer client querying packet may be transmitted to an Ethernet device concatenated with the buffer server, but may not be forwarded cross a network bridge. The Ethernet device concatenated with the buffer server may transmit the buffer client registering packet to the buffer server. Thus, a time delay of forwarding a packet between the buffer server and the buffer client is short.

At block 402, the buffer client accesses the Ethernet, and starts a distributed buffer function, and monitors the multicast buffer client querying packet from the buffer server.

For example, the buffer client may monitor the multicast buffer client querying packet according to a characteristic such as a protocol number, a designated target address of the multicast buffer client querying packet (e.g., 0180C2000002).

At block 403, when the buffer client receives the multicast buffer client querying packet from the buffer server in a port, reserves an independent logic area as a distributed buffer area in a CBP for the buffer server, and transmits a buffer client registering packet to the buffer server.

In some examples, at block 401, the multicast buffer client querying packet transmitted from the buffer server may carry a VLAN ID on the buffer server.

In some examples, at block 403, after receiving the multicast buffer client querying packet, the buffer client generates a substantially random VLAN ID, and the substantially random VLAN ID is used for the distributed buffer packet from the buffer server.

The buffer client registering packet from the buffer client may carry the substantially random VLAN ID. Thus, when the buffer server forwards a packet to the buffer client, the packet may carry the substantially random VLAN ID. The buffer client may determine the packet as the distributed buffer packet according to the substantially random VLAN ID, and may buffer the packet in the distributed buffer area reserved for the buffer server. When the buffer client returns the packet in the distributed buffer area to the buffer server, the packet may carry the substantially random VLAN ID. Thus, the buffer server may determine the packet as the returned distributed buffer packet according to the substantially random VLAN ID, and forwards the packet to a destination device of the packet.

In some examples, the buffer client registering packet from the buffer client may carry the size of the distributed buffer area reserved for the buffer server in the CBP, so that the buffer server may select the buffer client from the distributed buffer group of the port according to sizes of distributed buffer areas respectively reserved on the buffer clients in the distributed buffer group for the first device.

In some examples, it may be preset so that one buffer client transmits a buffer client registering packet to one buffer server. The buffer client may perform procedures at block 403 when receiving a first multicast buffer client querying packet, and may discard a multicast buffer client querying packet received after the first multicast buffer client querying packet.

In some examples, one buffer client may respectively initiate buffer client registering packets to multiple buffer servers.

At block 404, the buffer server receives the buffer client registering packet from the buffer server through the port, and adds the buffer client into the distributed buffer group of the port.

Figure 5:
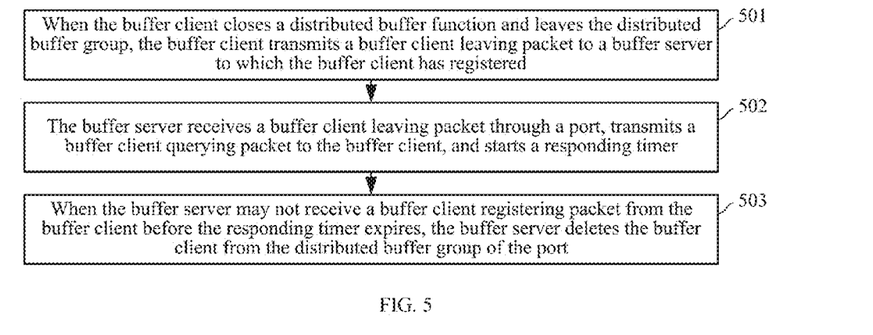
FIG. 5 is a flowchart illustrating a method that a buffer client leaves a distributed buffer group according to some examples of the present disclosure.

FIG. 5 is a flowchart illustrating a method that a buffer client leaves a distributed buffer group according to some examples of the present disclosure. The method includes procedures as follows.

At block 501, when the buffer client closes a distributed buffer function and leaves the distributed buffer group, the buffer client transmits a buffer client leaving packet to a buffer server to which the buffer client has registered.

At block 502, the buffer server receives a buffer client leaving packet through a port, transmits a buffer client querying packet to the buffer client, and starts a responding timer.

At block 503, when the buffer server may not receive a buffer client registering packet from the buffer client before the responding timer expires, the buffer server deletes the buffer client from the distributed buffer group of the port.

Figure 6:
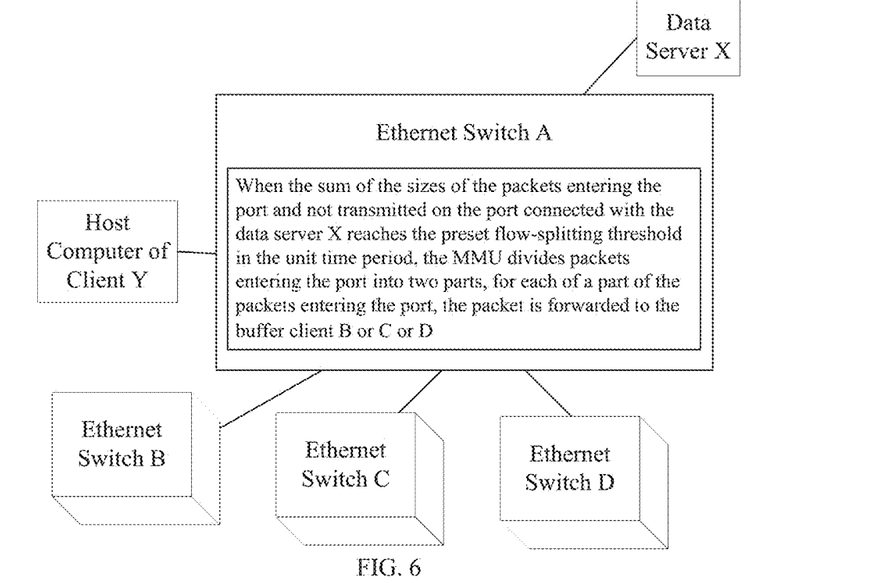
FIG. 6 is a schematic diagram illustrating a network topology according to some examples of the present disclosure.

In some application examples of the present disclosure, a network topology is illustrated in FIG. 6. A large amount of data is forwarded between a data server X and a client Y, and a reception capacity of the client Y is weaker than a transmission capability of the data server X. A packet buffering process may be performed as follows.

1) A network management device sets an Ethernet switch A as a buffer server, and sets Ethernet switches B, C and D, as buffer clients.

2) A first pause threshold, a first flow-splitting threshold and a packet discarding threshold, a second pause threshold, and a second flow-splitting control threshold are configured for a CBP on the buffer server A.

3) The buffer server A transmits a multicast buffer client querying packet. When receiving the multicast buffer client querying packet, the buffer client B randomly generates a VLAN ID 100 as a VLAN ID of the buffer client B used for the distributed buffer function, and transmits a buffer client registering packet carrying the VLAN ID 100 to the buffer server A. When receiving the multicast buffer client querying packet, the buffer client C randomly generates a VLAN ID 200 as a VLAN ID of the buffer client C used for the distributed buffer function, and transmits a buffer client registering packet carrying the VLAN ID 200 to the buffer server A. When receiving the multicast buffer client querying packet, the buffer client D randomly generates a VLAN ID 300 as a VLAN ID of the buffer client D used for the distributed buffer function, and transmits a buffer client registering packet carrying the VLAN ID 300 to the buffer server A.

4) When a sum of sizes of packets not transmitted on the port of the buffer server A connected with the data server X reaches the preset first pause control threshold in a unit time period, a MMU of the buffer server A notifies the PIC starts to transmit a Pause frame to request the data server X to decrease transmission speed.

5) When the sum of the sizes of the packets not transmitted on the port connected with the data server X reaches the preset flow-splitting threshold in the unit time period, the MMU of the buffer server A divides packets entering the port and not transmitted into two parts, and a part of the packets are directly forwarded to the host computer of the client Y, and for each of the other part of the packets, the packet is forwarded to the buffer client B or C or D. If the packet is forwarded to the buffer client B, the VLAN ID 100 is added into the packet before the packet is forwarded to the buffer client B. If the packet is forwarded to the buffer client C, the VLAN ID 200 is added into the packet before the packet is forwarded to the buffer client C. If the packet is forwarded to the buffer client D, the VLAN ID 300 is added into the packet before the packet is forwarded to the buffer client D.

After receiving the packet carrying the VLAN ID 100, the buffer client B buffers the packet in the distributed buffer area reserved for the buffer server A in the CBP of the buffer client B, and returns the packet to the buffer server A after a substantially random time period. After receiving the packet carrying the VLAN ID 200, the buffer client C buffers the packet in the distributed buffer area reserved for the buffer server A in the CBP of the buffer client C, and returns the packet to the buffer server A after a substantially random time period. After receiving the packet carrying the VLAN ID 300, the buffer client D buffers the packet in the distributed buffer area reserved for the buffer server A in the CBP of the buffer client D, and returns the packet to the buffer server A after a substantially random time period.

6) When the sum of the sizes of the packets entering the port and not transmitted connected with the data server X reaches the packet discarding threshold, the MMU of the buffer server A notifies the PIC starts to discard the packets entering the port and not transmitted.

7) When the sum of the sizes of the packets entering the port and not transmitted connected with the data server X decreases to the packet discarding threshold, the MMU of the buffer server A notifies the PIC to stop discarding the packets entering the port and not transmitted; when the sum of the sizes of the packets entering the port and not transmitted connected with the data server X decreases to the second flow-splitting threshold, the MMU of the buffer server A notifies the PIC to stop forwarding the packets entering the port and not transmitted to the buffer clients; and when the sum of the sizes of the packets not transmitted on the port connected with the data server X decreases to the second pause threshold, the MMU of the buffer server A notifies the PIC to stop transmitting the pause frame.

According to some examples of the present disclosure, a buffer client reserves an area for a buffer server in the CBP. When packets entering a port of the buffer server suddenly increase, the buffer server may forward a part of the packets to the buffer client to be temperately buffered, so that the packet discarding is avoided for the buffer server.

Figure 7:
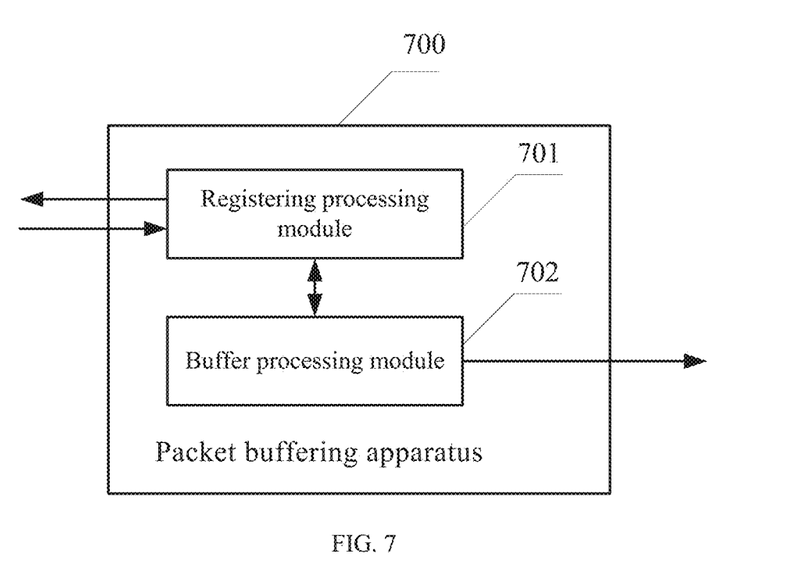
FIG. 7 is a schematic diagram illustrating a structure of a packet buffering apparatus according to some examples of the present disclosure.

FIG. 7 is a schematic diagram illustrating a structure of a packet buffering apparatus according to some examples of the present disclosure. The apparatus 700 applies to a first device as a buffer server in an Ethernet. The apparatus 700 includes a registering processing module 701 and a buffer processing module 702.

The registering processing module 701 is to transmit a buffer client querying packet from a port of enabling a distributed buffer function of the first device, receive a buffer client registering packet from a second device through the port, and add the second device into a distributed buffer group of the port.

The buffer processing module 702 is to forward a packet entering the port and not transmitted to a buffer client selected from the distributed buffer group of the port when the first device detects that a sum of sizes of packets entering the port and not transmitted reaches a preset first flow-splitting threshold in a first preset time period.

In some examples, the buffer processing module 702 is further to after the first device detects that the sum of the sizes of the packets entering the port and not transmitted reaches the preset first flow-splitting threshold in the first preset time period, stop forwarding the packet entering the port and not transmitted to the selected buffer client when the first device detects in a second preset time period that the size of the packets entering the port and not transmitted is lower than a preset second flow-splitting threshold.

In some examples, the buffer processing module 702 is further to before the first device detects that the sum of the sizes of the packets entering the port and not transmitted on the port reaches the preset first flow-splitting threshold in the preset first time period, start to transmit a Pause frame when the first device detects that the sum of the sizes of the packets entering the port and not transmitted reaches a preset first pause threshold in a preset third time period, wherein the first pause threshold is less than the first flow-splitting threshold.

In some examples, the buffer processing module 702 is further to after the first device detects that the sum of the sizes of the packets entering the port and not transmitted reaches the first flow-splitting threshold in the preset first time period, start to discard the packets entering the port and not transmitted when the first device detects that the sum of the sizes of the packets entering the port and not transmitted reaches a packet discarding threshold in a preset fourth time period, wherein the packet discarding threshold is more than the first flow-splitting threshold.

In some examples, after the first device detects that the sum of the sizes of the packets entering the port and not transmitted reaches the first flow-splitting threshold in the preset first time period, the buffer processing module 702 is further to start to discard the packets entering the port and not transmitted when the first device detects that the sum of the sizes of the packets entering the port and not transmitted reaches a packet discarding threshold in a preset fourth time period, wherein the packet discarding threshold is more than the first flow-splitting threshold.

In some examples, after the first device detects that the sum of the sizes of the packets entering the port and not transmitted is lower than the preset second flow-splitting threshold in the preset second time period, the buffer processing module 702 is further to stop transmitting the Pause frame from the port when the first device detects that the sum of the sizes of the packets entering the port and not transmitted on the port decreases to a preset second pause threshold in a preset sixth time period, wherein the second flow-splitting threshold is more than the second pause threshold.

In some examples, the buffer client querying packet transmitted from the registering processing module 701 may carry a VLAN ID on the first device. The buffer client registering packet received by the registering process module 701 may carry a VLAN ID of the second device used for the distributed buffer function.

In some examples, the buffer processing module 702 is to add the VLAN ID of the second device used for the distributed buffer function into the packet, and forwards the packet to the selected buffer client.

In some examples, the buffer client registering packet received by the registering process module 701 may further carry a size of a distributed buffer area reserved in a CBP for the first device, so that the buffer server may select the buffer client from the distributed buffer group of the port according to sizes of distributed buffer areas respectively reserved on the buffer clients in the distributed buffer group for the first device.

In some examples, the registering processing module 701 is further to when the first device transmits the buffer client querying packet from the port, the first device may start a responding timer.

In some examples, the registering processing module 701 is further to when receiving the buffer client registering packet from the port before the responding timer expires, add the second device into the distributed buffer group as the buffer client, set and start a host computer aging timer for the second device when the second device is in the distributed buffer group, and restart the host computer aging timer of the second device when the second device has been as the buffer client in the distributed buffer group.

In some examples, the registering processing module 701 is further to when receiving the buffer client registering packet from the second device through the port after the responding timer expires, the first device discards the buffer client registering packet.

In some examples, the registering processing module 701 is further to when the first device detects that a host computer aging timer of a third device in the distributed buffer group of the port expires, transmit a second buffer client querying packet to the third device, and start the responding timer; if the buffer client registering packet from the third device is not received before the responding timer expires, the first device may delete the third device from the distributed buffer group; if the buffer client registering packet from the third device is received before the responding timer expires, the first device may restart the host computer aging timer of the third device.

In some examples, a timing period of the host computer aging timer is more than a transmission period of the buffer client querying packet, and the transmission period of the buffer client querying packet is more than a timing period the responding timer.

In some examples, when the packet entering the port and not transmitted is from the buffer client in the distributed buffer group of the port, the buffer processing module 702 is to forward the packet to a destination device of the packet in local; when a packet entering the port and not transmitted is a Dynamic Host Configuration Protocol (DHCP) class packet based on a IP encapsulation protocol, a Spanning Tree Protocol (STP) class multicast packet based on a reserved protocol, or a routing protocol control packet, the first device forwards the packet to a destination device of the packet in local; when a priority of a packet entering the port is more than a preset priority threshold, the first device forwards the packet to a destination device of the packet in local, when the priority of the packet entering the port and not transmitted is not more than the preset priority threshold, the first device forwards the packet to a buffer client in the distributed buffer group of the port; when a packet entering the port and not transmitted is an unknown unicast packet, the first device forwards the packet to a buffer client in the distributed buffer group; when a packet entering the port and not transmitted is a known unicast packet, or a multicast packet, or a broadcasting packet, the first device performs Hash calculation for a preset characteristic value of the packet, according to a Hash calculation result, a remaining size of the CBP on the port of the first device and a size of a distributed buffer area reserved for the first device on a buffer client of the first device, the first device determines whether to forward the packet to the destination device of the packet or to forward the packet to a buffer client in the distributed buffer group of the port.

In some examples, when receiving a buffer client leaving packet from a fourth device through the port, the registering processing module 701 is to transmit a third buffer client querying packet to the fourth device, and start a responding timer; when a buffer client registering packet is not received from the fourth device when the responding timer expires, delete the fourth device from the distributed buffer group of the port.

In some examples, the buffer client query packet may be a slow protocol reserved protocol multicast packet.

Figure 8:
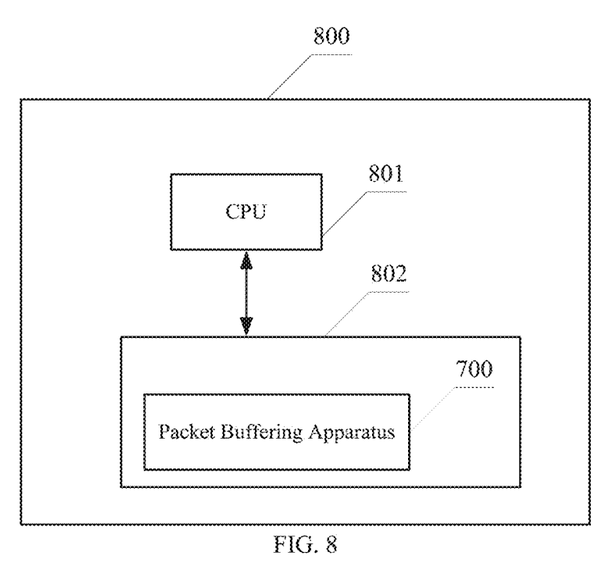
FIG. 8 is a schematic diagram illustrating a structure of a buffer server according to some examples of the present disclosure.

FIG. 8 is a schematic diagram illustrating a structure of an Ethernet device as a buffer server including a packet buffer apparatus according to some examples of the present disclosure. As shown in FIG. 8, the Ethernet device 800 includes a processor such as a CPU 801 and a non-transitory machine readable storage medium 802. In some examples, the Ethernet device 800 may further include other hardware.

The non-transitory machine readable storage medium 802 is to store machine readable instructions that are executable by the CPU 801. The operations carried out by the machine readable instructions when executed by the CPU 801 include the functions carried out by the packet buffering apparatus.

The CPU 801 is to communicate with the non-transitory machine readable storage medium 802, to read and execute the machine readable instructions stored in the non-transitory machine readable storage medium 802 so as to implement the functions carried out by the packet buffering apparatus 700.

The packet buffering apparatus 700 is a logic apparatus, which may be implemented by the CPU 801 executing machine readable instructions in the non-transitory machine readable storage medium 802. When the corresponding machine readable instructions are executed, the packet buffering apparatus 700 executes the corresponding operations according to the method described herein.

Figure 9:
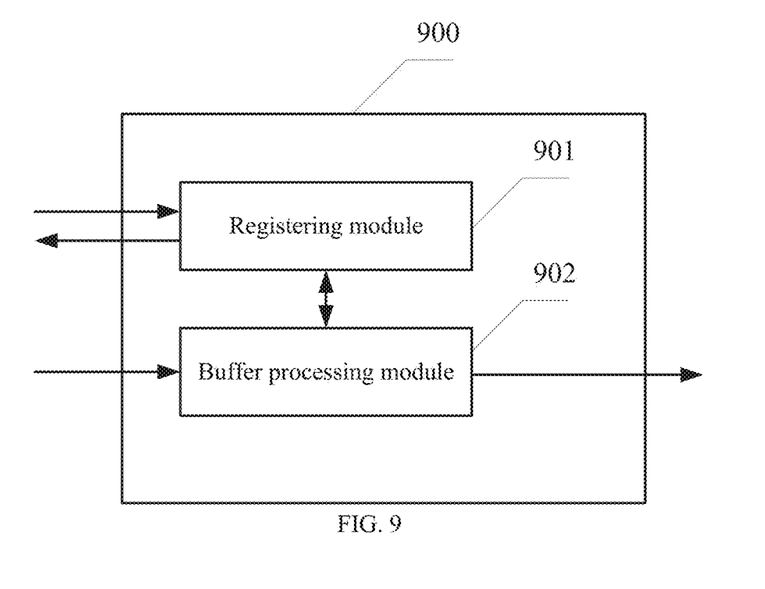
FIG. 9 is a schematic diagram illustrating a structure of a packet buffering apparatus according to some examples of the present disclosure.

FIG. 9 is a schematic diagram illustrating a structure of a packet buffering apparatus according to some examples of the present disclosure. As shown in FIG. 9, the apparatus 900 includes a registering module 901 and a buffer processing module 902.

After receiving a buffer client querying packet from a first device as a buffer server, the registering module 901 is to reserve a distributed buffer area in a common buffer pool (CBP) of a second device including the packet buffer apparatus for the first device, transmit a buffer client registering packet to the first device.

The buffer processing module 902 is to receive a packet from the first device, determine whether the packet is a distributed buffer packet, and buffer the packet in the distributed buffer area when the packet is the distributed buffer packet.

In some examples, the buffer client querying packet received by the registering module 901 may carry a VLAN ID on the first device.

In some examples, the buffer client registering packet transmitted from the registering module 901 may carry a VLAN ID of the second device used for the distributed buffer function.

In some examples, the distributed buffer processing module 902 is to determine whether the packet carries a VLAN ID of the second device used for a distributed buffer function, determine that the packet is the distributed buffer packet when the packet carries the VLAN ID of the second device used for a distributed buffer function.

In some examples, the buffer client registering packet transmitted from the registering module 901 may further carry a size of the distributed buffer area reserved in a CBP for the first device, so that the buffer server may select the buffer client from the distributed buffer group of the port according to sizes of distributed buffer areas respectively reserved on the buffer clients in the distributed buffer group for the first device.

In some examples, the buffer processing module 902 is further to after the second device buffers the packet in the distributed buffer area reserved for the first device, according to a FIFO way, return the packet to the first device after the second device waits for a buffer time period from a time point of returning a previously-buffered packet to the first device.

In some example, the buffer processing module 902 is to when the packet is buffered in the distributed buffer area reserved for the first device, multiply n by quanta to obtain T, wherein T is a buffer time period, n is a substantially random value between 0 and 65535, and quanta is a pause time quantum.

In some examples, when the distributed buffer function is closed, the registering module 901 is further to transmit a buffer client leaving packet to each buffer server to which the second device has registered.

Figure 10:
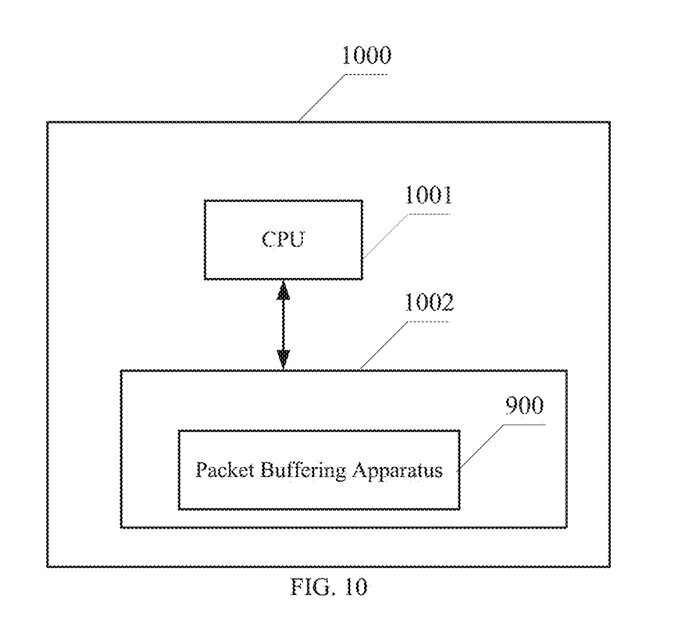
FIG. 10 is a schematic diagram illustrating a structure of a buffer client according to some examples of the present disclosure.

FIG. 10 is a schematic diagram illustrating a structure of an Ethernet device as a buffer client including a packet buffer apparatus according to some examples of the present disclosure. As shown in FIG. 10, the Ethernet device 1000 includes a processor such as a CPU 1001 and a non-transitory machine readable storage medium 1002. In some examples, the Ethernet device 800 may further include other hardware.

The non-transitory machine readable storage medium 1002 is to store machine readable instructions that are executable by the CPU 1001. The operations carried out by the machine readable instructions when executed by the CPU 1001 include the functions carried out by the packet buffering apparatus.

The CPU 1001 is to communicate with the non-transitory machine readable storage medium 1002, to read and execute the machine readable instructions stored in the non-transitory machine readable storage medium 1002 so as to implement the functions carried out by the packet buffering apparatus 900.

The packet buffering apparatus 900 is a logic apparatus, which may be implemented by the CPU 1001 executing machine readable instructions in the non-transitory machine readable storage medium 1002. When the corresponding machine readable instructions are executed, the packet buffering apparatus 900 executes the corresponding operations according to the foregoing method.

The non-transitory machine readable storage medium may be a physical storage device such as an electronic storage device, a magnetic storage device, an optical storage device etc., and may include or store information such as instructions, data etc. For example, the non-transitory machine readable storage medium 1002 may be a Radom Access Memory (RAM), a volatile memory, a non-volatile memory, a flash memory, a storage drive (such as a hard disk drive), a solid-state drive, a storage disk (such as a disc, DVD, etc.), a similar storage medium, or a combination thereof. Each of machine readable storage mediums as described above may be non-transitory.

What is claimed is:

1. A packet buffering method, comprising:
   transmitting, by a first device as a buffer server in an Ethernet, a first buffer client querying packet from a port of enabling a distributed buffer function of the first device;
   receiving, by the first device, a first buffer client registering packet from a second device through the port, adding the second device into a distributed buffer group of the port; and
   forwarding, by the first device to a buffer client selected from the distributed buffer group of the port, a packet entering the port and not transmitted when the first device detects that a sum of sizes of packets entering the port and not transmitted reaches a preset first flow-splitting threshold in a first preset time period.

2. The method of claim 1, comprising:
   after the first device detects that the sum of the sizes of the packets entering the port and not transmitted reaches the preset first flow-splitting threshold in the first preset time period, stopping forwarding the packet entering the port and not transmitted to the selected buffer client when the first device detects in a second preset time period that the sum of the sizes of the packets entering the port and not transmitted is lower than a preset second flow-splitting threshold.

3. The method of claim 1, wherein the first buffer client querying packet carries a Virtual Local Area Network (VLAN) Identifier (ID) of the first device;
   the first buffer client registering packet carries a VLAN ID of the second device used for the distributed buffer function; and
   the process of forwarding to the buffer client selected from the distributed buffer group of the port and not transmitted comprises:
   adding the VLAN ID of the second device used for the distributed buffer function into the packet, and forwarding the packet to the selected buffer client.

4. The method of claim 3, wherein the first buffer client registering packet further carries a size of a distributed buffer area reserved for the first device in a common buffer pool (CBP) of the second device.

5. The method of claim 1, further comprising:
   receiving, by the first device, a buffer client leaving packet from the second device, transmitting a second buffer client querying packet to the second device, starting a responding timer; and
   deleting, by the first device, the second device from the distributed buffer group of the port when a second buffer client registering packet from the second device is not received before the responding timer expires.

6. A packet buffering method, comprising:
   after receiving a buffer client querying packet from a first device as a buffer server, reserving, by a second device, a distributed buffer area in a common buffer pool (CBP) for the first device, transmitting a buffer client registering packet to the first device;
   receiving, by the second device, a packet from the first device, determining whether the packet is a distributed buffer packet, buffering the packet in the distributed buffer area when the packet is the distributed buffer packet.

7. The method of claim 6, wherein determining whether the packet is the distributed buffer packet comprises:

determining whether the packet carries a Virtual Local Area Network (VLAN) Identifier (ID) of the second device used for a distributed buffer function;

when the packet carries the VLAN ID of the second device used for the distributed buffer function, determining that the packet is the distributed buffer packet.

8. The method of claim 6, comprising:

after the second device buffers the packet in the distributed buffer area, returning the packet to the first device after the second device waits for a buffer time period from a time point of returning a previously-buffered packet to the first device.

9. A packet buffer apparatus, applying to a first device as a buffer server in an Ethernet, comprising:

a processor; and a non-transitory machine readable storage medium storing instructions, the instructions executable by the processor to cause the apparatus to:

transmit a buffer client querying packet from a port of enabling a distributed buffer function of the first device, receive a buffer client registering packet from a second device through the port, add the second device into a distributed buffer group of the port; and forward to a buffer client selected from the distributed buffer group of the port, a packet entering the port and not transmitted when the first device detects that a sum of sizes of packets entering the port and not transmitted reaches a preset first flow-splitting threshold in a first preset time period.

10. The apparatus of claim 9, wherein the instructions executable by the processor cause the apparatus to: after the first device detects that the sum of the sizes of the packets entering the port and not transmitted reaches the preset first flow-splitting threshold in the first preset time period, stop forwarding the packet entering the port and not transmitted to the selected buffer client when the first device detects in a second preset time period that the sum of the sizes of the packets entering the port and not transmitted is lower than a preset second flow-splitting threshold.

11. The apparatus of claim 9, wherein the buffer client querying packet carries a Virtual Local Area Network (VLAN) Identifier (ID) of the first device;

the buffer client registering packet carries a VLAN ID of the second device used for the distributed buffer function; and instructions executable by the processor cause the apparatus to: add the VLAN ID of the second device used for the distributed buffer function into the packet, and forward the packet to the selected buffer client.

12. The apparatus of claim 11, wherein the buffer client registering packet further carries a size of a distributed buffer area reserved for the first device in a common buffer pool (CBP) of the second device.

13. A packet buffering apparatus, comprising:

a processor; and a non-transitory machine readable storage medium storing instructions, the instructions executable by the processor to cause the apparatus to:

after receiving a buffer client querying packet from a first device as a buffer server, reserve a distributed buffer area in a common buffer pool (CBP) of a second device including the packet buffering apparatus for the first device, and transmit a buffer client registering packet to the first device;

receive a packet from the first device, determine whether the packet is a distributed buffer packet, and buffer the packet in the distributed buffer area when the packet is the distributed buffer packet.

14. The apparatus of claim 13, wherein the instructions executable by the processor cause the apparatus to: determine whether the packet carries a Virtual Local Area Network (VLAN) Identifier (ID) of the second device used for a distributed buffer function, when the packet carries the VLAN ID of the second device used for a distributed buffer function, determine that the packet is the distributed buffer packet.

15. The apparatus of claim 13, wherein the instructions executable by the processor cause the apparatus to: after the second device buffers the packet in the distributed buffer area, return the packet to the first device after the second device waits for a buffer time period from a time point of returning a previously-buffered packet to the first device.

* * * * *